United States Patent [19]

Hornburger et al.

[11] Patent Number: 4,634,812
[45] Date of Patent: Jan. 6, 1987

[54] METHOD OF TRANSFERRING INFORMATION BETWEEN MICROCOMPUTERS IN A DECENTRALIZED PROCESS CONTROL SYSTEM, PARTICULARLY FOR TELEPHONE SYSTEMS

[75] Inventors: Detlev Hornburger, Pinneberg; Albrecht Schaffert, Stuttgart; Henner Schneider, Dieburg, all of Fed. Rep. of Germany

[73] Assignee: International Standard Electric Corporation, New York, N.Y.

[21] Appl. No.: 625,760

[22] Filed: Jun. 28, 1984

[30] Foreign Application Priority Data

Jul. 7, 1983 [DE] Fed. Rep. of Germany ....... 3324504

[51] Int. Cl.⁴ .............................................. H04Q 3/42
[52] U.S. Cl. ............................... 379/269; 340/825.53
[58] Field of Search .............. 179/18 ES, 18 EE, 18 J

[56] References Cited

U.S. PATENT DOCUMENTS 4,317,962 3/1982 Cox et al. ....................... 179/18 ES
4,421,955 12/1983 Mori et al. ..................... 179/18 EA
4,528,658 7/1985 Israel ................................. 370/58

FOREIGN PATENT DOCUMENTS 0071910 6/1979 Japan ............................. 179/18 ES
588657 1/1978 U.S.S.R. ......................... 179/18 ES Primary Examiner—Thomas W. Brown
Attorney, Agent, or Firm—John T. O'Halloran; Thomas F. Meagher

[57] ABSTRACT

The invention relates to a method of transferring information between microcomputers in a decentralized process control system, particularly for telephone systems. To prevent contention for possession of the information transfer bus without the need for central equipment, a simple bus system consisting of a multiwire data bus and two single-wire control buses is proposed. Bus mastership is passed on after transmission, with the address of the next transmitter being determined by each microcomputer itself and forming part of each message. Bus mastership is determined by communication of the previous transmitter and by calculations performed by the microcomputer itself.

3 Claims, 4 Drawing Figures

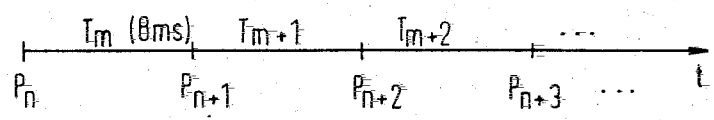

METHOD OF TRANSFERRING INFORMATION BETWEEN MICROCOMPUTERS IN A DECENTRALIZED PROCESS CONTROL SYSTEM, PARTICULARLY FOR TELEPHONE SYSTEMS

BACKGROUND OF THE INVENTION

The present invention relates to a method of transferring information between microcomputers in a decentralized process control system.

As described in the West German journal "Elektrisches Nachrichtenwesen", Vol. 52, No. 3, 1977, pp. 231–236, in process control systems, the processors and memories available until that time became more economical with increasing centralization; therefore, faster and larger central control units were used whose costs increased more slowly than their efficieny. However, the use of a central control unit for a large number of tasks requires that the tasks be handled by the processor successively in time. To this end, the tasks, parts of which occur in parallel, must be arranged in a time sequence ahead of the processor, and the results must be distributed to parallel receivers. This creates special problems, such as the operational organization for executing the tasks at the correct time, program interrupts by tasks of higher priority, and steps to avoid failures of the central processor. Further problems are caused by the high cost of the basic equipment of a center and the lack of flexibility when the system has to be adapted to a new configuration level. These problems show the limits of centralized data processing.

Tasks frequently occur not only sequentially but also in parallel, such as the processing of subscribers' wishes in telephone switching centers. Microcomputers make it possible to use stored-program-controlled processing at decentralized locations where the tasks occur. The microcomputers are interconnected to form a multiprocessing system. Each microcomputer performs a share of the control tasks of the overall system.

Such decentralized process control systems generally improve the throughput, flexibility, availability, and reliability of computers.

West German patent publication DE 32 12 556 discloses a switching system with distributed control. The data bus consists, for example, of eight wires for parallel data transfer and of two single-wire control buses. All signalling data required to set up, hold, and release a call is transferred over these buses. For the data transfer via a bus controller and the data bus, the latter can be granted on a fixed cyclical basis, without regard to priorities. However, bus mastership is granted centrally, so that difficulties will arise if the central arbitration fails.

West German patent publication DE 27 24 431 discloses a method of switching calls through a telecommunication switching system with decentralized control wherein each decentralized control continuously receives the states of all other decentralized controls which are important to the connection setup of the terminating equipment, and wherein, to establish the connections, the decentralized controls send control instructions to peripheral equipment or other decentralized controls which take the already stored current states of the remaining centralized controls into account. For the interaction of the controls, a multiwire signalling line, a separate control line, a multiwire connecting line, and a stepping line are employed. The signalling line is used by a decentralized control only as long as it is needed for the transfer from the sending data station or to the receiving data station. Over the separate control line, a request to read the message transferred over the signalling line is sent from the transmitting decentralized control to the decentralized controls which are not transmitting, and the receiving decentralized controls are informed that the processing of the transmitted messages has not been completed yet. The stepping line interconnects the decentralized controls in the form of a ring circuit, and transfers signals such that the following decentralized control is prepared for the transmit mode as soon as the transmission of the preceding decentralized control on the signalling line has been completed. A central counter is provided which is cyclically incremented after the absence of a signal on the separate control line or the signalling line for a predetermined safety time, with each number of the possible counts assigned a particular decentralized control, and with the count output connected via a decoder and a connecting line to the individual data stations and successively switching the latter to the transmit state.

Here, too, a central element, the counter, is present, which poses special reliability problems. In addition, many wires are needed to transfer the information between the decentralized controls.

West German patent publication DE 27 08 244 discloses a method of controlling a switching system with a group of small computers each of which is connected to a group of independent microcomputers and to a master computer for priority control.

The small computers are interconnected by a bus over which information is transferred to buffer memories associated with the small computers. These buffer memories serve to match the signal flows between the computers and the bus because the devices connected to the bus can receive or deliver the signals only at precisely specified instants. In the case of a time-division-multiplex telephone exchange, a frame with 32 channels is used for the information transfer over the bus. In one embodiment, two channels are reserved for each computer of a total of 16 computers, one channel containing the address of the small computer, and the other containing the actual information. An address comparator for each small computer senses the information intended for the associated small computer. Sometimes, however, this systematic reservation of a transmission time for each small computer is not adapted to the traffic conditions. It is proposed, therefore, to assign the information transmission times with the aid of the master computer.

This TDM method uses a central clock generator, so that it suffers from the disadvantages described above. For smaller process control systems, time-division multiplexing is also too costly.

A switching system with central control and decentralized controls is disclosed in West German patent publication DE 27 20 833. There, the decentralized controls are interconnected by an address bus in addition to the actual data bus, so that a large number of control lines is present again. In addition, a relatively large amount of hardware and software is required to control the information transfer, particularly for bus control, so that it is doubtful whether economic use is possible, especially in smaller systems.

SUMMARY OF THE INVENTION

The object of the invention is to provide a method of the kind set forth in the preamble of the claim which manages with a simple bus system with a minimum of lines and with minimum control circuitry but permits high flexibility, particularly with respect to the number of units connected, and which operates reliably by avoiding central control units.

The invention permits the use of an information transfer bus consisting of only two control lines and eight data lines. This offers the advantage that all computer modules connected to the information transfer bus can be of identical design.

BRIEF DESCRIPTION OF THE DRAWING

An embodiment of the invention will now be explained in more detail with reference to the accompanying drawings, in which:

FIG. 3 shows the format of the transferred data, and

FIG. 4 is a time diagram for the transmission of the messages of the individual microcomputers.

DESCRIPTION OF THE PREFERRED EMBODIMENT

Figure 1:
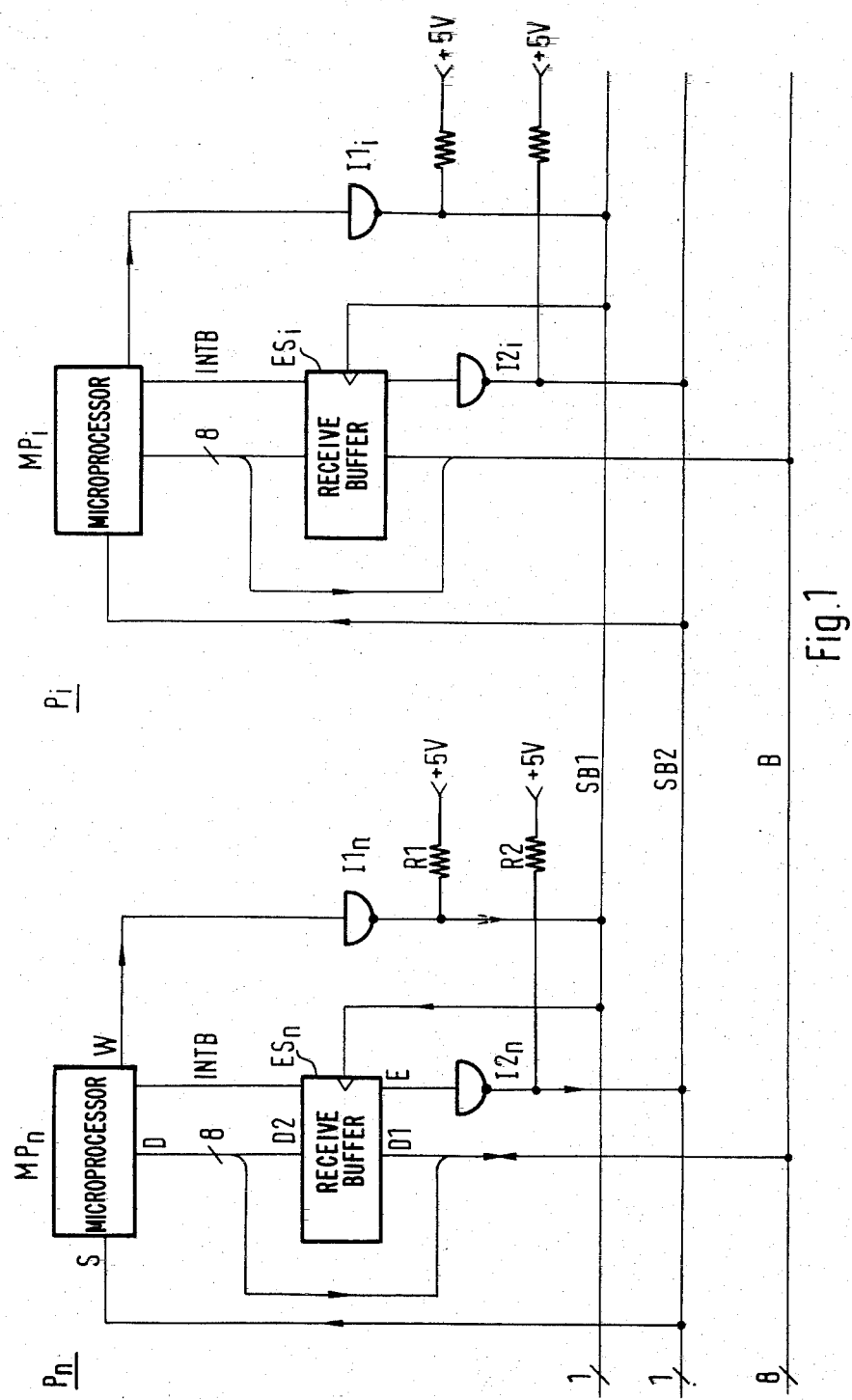
FIG. 1 shows circuit arrangements of two exemplary microcomputers with their bus connections in accordance with the invention.

FIG. 1 shows two microcomputers $P_n$ and $P_i$, the first of which consists of a micrcoprocessor $MP_n$, a receive buffer $ES_n$, and two inverters $I1_n$, $I2_n$. The microprocessor $MP_n$ is connected to a single-wire control bus SB1 through its read-instruction output W and the inverter $I1_n$. The output of this inverter is connected to the positive terminal of a 5-V voltage source through a resistor R1. The control bus SB1 is connected to the read-instruction input L of the receive buffer $ES_n$. An output E of the receive buffer $ES_n$, which output provides signals indicating the empty and full states of the receive buffer, is connected through the inverter $I2_n$ to a second single-wire control bus SB2, which is connected to the send-instruction input S of the microprocessor $MP_n$. The output of the inverter $I2_n$ is connected to the positive terminal of the 5-V voltage source through a resistor R2. An eight-wire data bus B is connected to the input D1 of the receive memory $ES_n$, which transfers the received data through its data output D2 to the data input/output D of the microprocessor $MP_n$. For the transfer of data from the micoprocessor $MP_n$ to the data bus B, the receive buffer $ES_n$ can be bypassed.

Over a connection INTB, an interrupt request can be sent from the receive buffer $ES_n$ to the microprocessor $MP_n$.

The other microcomputers are of the same design and have the same connections as the microcomputer $P_n$. The reference characters of the corresponding parts of the further microcomputer $P_i$, which is illustrated by way of example, are provided with the subscript i instead of the subscript n.

The following explanation of the method assumes that a maximum of 32 computers $P_0$ to $P_{31}$ is permitted, that each microcomputer is assigned an address which can be selected, for example, via a switch on the module and fed to the microcomputer through an I/O port, and that each microcomputer contains a clock generator from whose clock signal an 8-ms interrupt is derived, and a RESET circuit, the so-called power-on reset.

After the turning on of power and the subsequent resetting of the circuits to the initial state by means of the RESET instruction, each microcomputer reads the address selected for it ($P_O$ to $P_{31}$). In accordance with a special initial program, the microcomputers $P_1$ to $P_{31}$ will not seize the data bus B for the time being but will wait for a corresponding request from the microcomputer $P_0$. In this manner, the bus is granted cyclically. Thus, the first microcomputer which is given bus mastership after RESET is $P_0$. For the data transfer, a uniform format can be fixed.

As shown in FIG. 3, a computer message normally consists of 16 bytes (1 byte=8 bits). The format of FIG. 3 refers to an application in a telephone switching system. It goes without saying that the basic principle illustrated here is also applicable to other cases. The time sequence of the transmission of the messages to be placed on the data bus by the individual micropomputers is sketched in FIG. 4.

After the microcomputer $P_n$ has sent out its message in a time interval $T_m$, the microcomputer $P_{n+1}$ is to transmit in the following time interval $T_{m+1}$. Since the bytes 1 and 2 of the message must be read by all microcomputers, the next microcomputer $P_{n+1}$ is known to each microcomputer. If the time interval T, e.g., 8 ms, is known, too, each microcomputer can even determine when it is granted bus mastership. Thus, it is possible to detect faulty modules or modules on which no components have been inserted. It is even possible for each microcomputer to learn the current system configuration after a system cycle and then address the next sender $P_{n+1}$ on its own.

The information transfer between the microcomputers takes place as follows. The transmitting microcomputer $P_i$ places its data on the bus B. If a read request is delivered at the output W of all microcomputers, these data are written into the receive buffers. From this read request, an interrupt signal INTRB is derived for each microcomputer. It causes a break in the current programs of the microcomputers and a branch to a subroutine. This subroutine causes the content of the receive buffer to be read, so that the transmitted data are available to the microcomputers for further processing.

Simultaneously with the interrupt, a control signal is provided at the output E, namely a signal RBE which indicates that the receive buffer is empty, and that the processor is ready to receive. Since the time for responding to the interrupt request will be different in the receiving microprocessors dependent on the current program status, the transmitting microprocessor must not write a new data byte into the receive buffer until the microcomputer has set its RBE signal. If, for example, a low state at the output E indicates the empty state of the receive buffer, and a high state the full state of the receive buffer, these conditions are reversed at the output of the inverter $I2_n$. As long as a low state, which is equivalent to zero potential of the voltage source (5 V), is caused on the control bus SB2 by any microprocessor, the microprocessor $MP_i$ will not be requested to begin to transmit the next byte. The request for transmission is not made until the last microcomputer produces a high state at the output of its inverter I2.

To prevent an interrupt from being caused by the transmitting microcomputer itself, which then would read its own data, the interrupt signal INTRB is masked by the transmitting microprocessor, and the RBE signal is not set by the transmitting processor.

After receipt of the first interrupt signal, each receiving microprocessor begins to count the time interval T, so that synchronization is established. As described above, further bus granting is accomplished in this manner, which eliminates the need for complicated addressing operations and special address lines.

In the case of the microcomputers which are not directly addressed, only the first two interrupt requests are answered with the signal RBE; the others may be accepted and counted but are not answered with the signal RBE.

Figure 2:
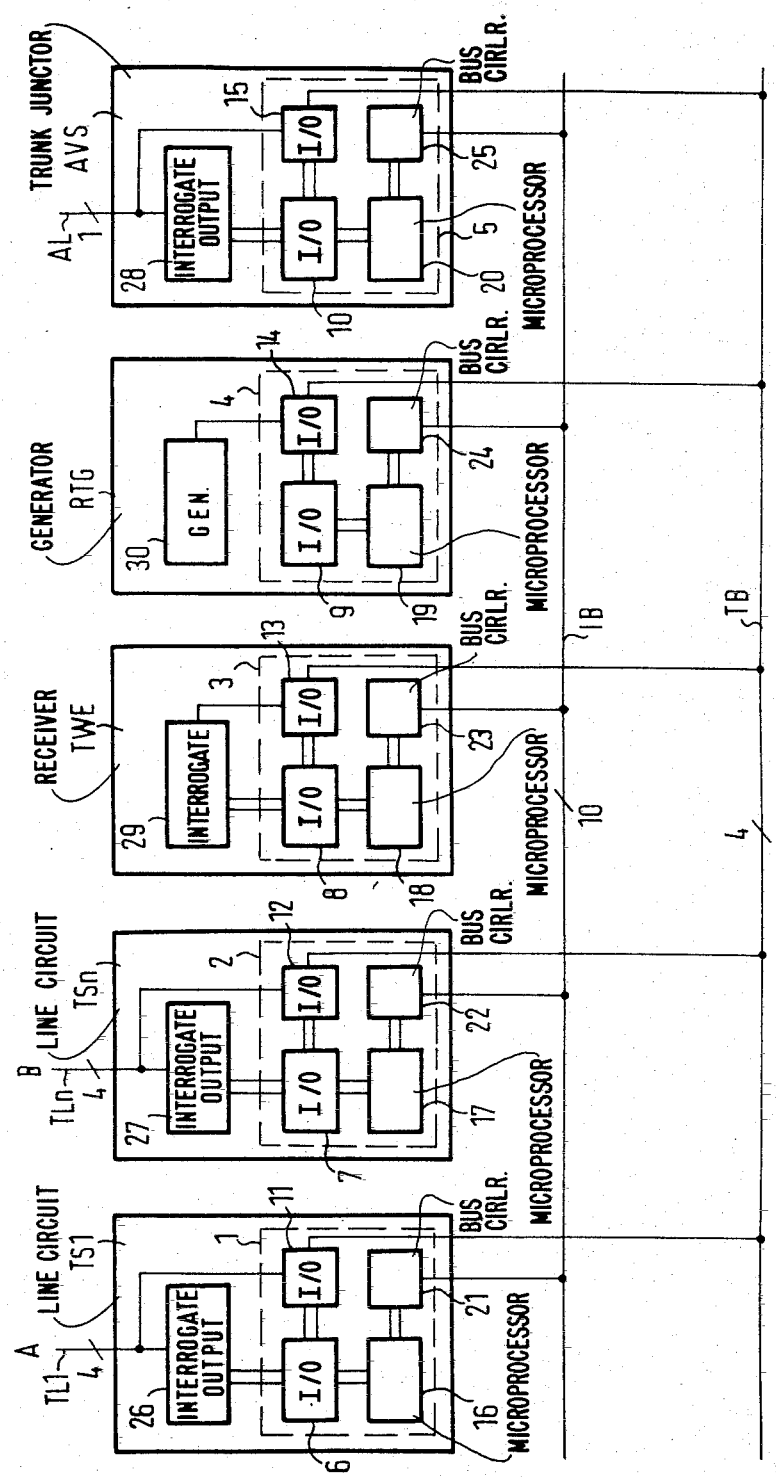
FIG. 2 shows a circuit arrangement of a telecommunication switching system in which the bus system according to the invention can be used.

FIG. 2 shows an application of the invention in a telephone private branch exchange. The block diagram clearly shows the uniform modular construction (1, 2, 3, 4, 5) which is promoted by the invention. The decentralized control system consists of the microprocessor MP (16, 17, 18, 19, 20) and the bus controller BS (21, 22, 23, 24, 25). Each of the modular units further includes an interrogate/output circuit (26, 27, 28, 29, 30) adapted to the function to be performed (line circuit TS, trunk junctor AVS, push-button receiver TWE, ringing and tone generator RTG), an input/output circuit E/A (6, 7, 8, 9, 10) for the microprocessor, and a corresponding portion KN (11, 12, 13, 14, 15) of the switching network. Thus, the individual modules interconnected by the information transfer bus IB and the telephone bus TB can operate completely independently. The information transfer bus comprises the buses SB1, SB2 and B of FIG. 1. An exchange change constructed according to this scheme can be expanded at any time by adding further modules without any expensive previous work being necessary for central control tasks. Such a configuration is of considerable importance especially for smaller systems, where the ratio of the cost of central equipment to the cost of individual equipment is a major factor. Furthermore, the elimination of the need for complicated central control equipment, which can hardly be duplicated in smaller systems for cost reasons, improves the reliability of the overall system and, in the event of a failure, simplifies the testing and debugging work.

We claim:

1. A method of transferring information between a plurality of microcomputers in a decentralized process control system wherein the microcomputers are interconnected by a multiwire data bus (B) for transmission and reception of data thereover, a first single-wire control bus (SB1), and a second single-wire control bus (SB2) and each comprises a microprocessor (MP) and an associated bus controller (BS), particularly for telephone systems, comprising the steps of:
   providing a selectable address at one port of each microprocessor;
   connecting each of said ports to the data bus (B) via a receive buffer ($ES_0$ to $ES_n$) in each of said bus controllers, said receive buffers being bypassed during transmission by the microprocessor,
   sending a first byte of a message from whichever microprocessor ($MP_i$) is to send in a data-transfer sequence through a first inverter (I1) in said bus controller to the first single-wire control bus (SB1),
   sending the message first byte to the receive buffers ($ES_1$ to $ES_n$) of the other microcomputers,
   causing each of said receive buffers ($ES_1$ to $ES_n$), upon receiving said message first byte, to send an interrupt request signal (INTB) to its respective associated microprocessor;
   causing each of said receive buffers ($ES_1$ to $ES_n$) upon receiving a response to said interrupt request signal (INTB) to send a computer-ready signal through as second inverter located in its respective bus controller to said second single-wire control bus (SB2); and
   causing said second single-wire control bus (SB2) to prompt, if computer-ready signals from all of said receive buffers have been received, the sending microprocessor ($MP_i$) to send a next byte of said message.

2. The method of claim 1, further comprising the step of using all of said microcomputers to receive the first two bytes of a message while using only a receiver in an addressed microprocessor ($MP_n$) to read any remaining bytes of said message.

3. The method of claim 2, further comprising the step of structuring said message such that the first byte contains the address of said addressed microprocessor (MPn) and the second byte contains the address of a microprocessor which is to be entitled to send in a next cycle of said data-transfer sequence.

* * * * *